(12) United States Patent
West

(10) Patent No.: US 6,673,135 B2
(45) Date of Patent: Jan. 6, 2004

(54) SYSTEM AND METHOD OF SEPARATING ENTRAINED IMMISCIBLE LIQUID COMPONENT OF AN INLET STREAM

(75) Inventor: Hugh M. West, St. Albert (CA)

(73) Assignee: National Tank Company, Houston, TX (US)

( * ) Notice: Subject to any disclaimer, the term of this patent is extended or adjusted under 35 U.S.C. 154(b) by 18 days.

(21) Appl. No.: 10/072,079

(22) Filed: Feb. 8, 2002

(65) Prior Publication Data

US 2003/0150324 A1 Aug. 14, 2003

(51) Int. Cl.$^7$ .......................... B01D 50/00; B01D 45/12; B01D 47/00
(52) U.S. Cl. ..................... 95/268; 95/271; 55/323; 55/337; 55/349; 55/421; 55/443; 96/186; 96/190
(58) Field of Search ............... 95/268, 271; 55/337, 55/323, 324, 349, 421, 443, 446; 96/182, 184, 186, 189, 190

(56) References Cited

U.S. PATENT DOCUMENTS

| | | | | |
|---|---|---|---|---|
| 587,560 A | * | 8/1897 | Roberts | 55/421 |
| 604,844 A | * | 5/1898 | Roberts | 55/421 |
| 1,915,436 A | * | 6/1933 | Moore et al. | 96/171 |
| 2,610,697 A | * | 9/1952 | Lovelady et al. | 96/157 |
| 3,722,184 A | * | 3/1973 | McMinn | 96/179 |
| 6,409,808 B1 | * | 6/2002 | Chamberlain et al. | 96/182 |

* cited by examiner

Primary Examiner—Robert A. Hopkins
(74) Attorney, Agent, or Firm—Gable & Gotwals; Paul H. Johnson

(57) ABSTRACT

A system and a method for separating interdispersed gas and liquid components of an inlet stream includes introducing the inlet steam into a vessel having a dry gas outlet and a liquid outlet, passing the inlet stream into at least one vortex tube supported within the vessel, the vortex tube having a gas outlet and a liquid outlet, rapidly rotating the inlet stream within the vortex tube to separate entrained liquid and passing reduced moisture outlet gas from the vortex tube into the interior of the vessel and passing the outlet gas through a mist eliminator within the vessel to provide gas that is passed out the vessel dry gas outlet.

24 Claims, 3 Drawing Sheets

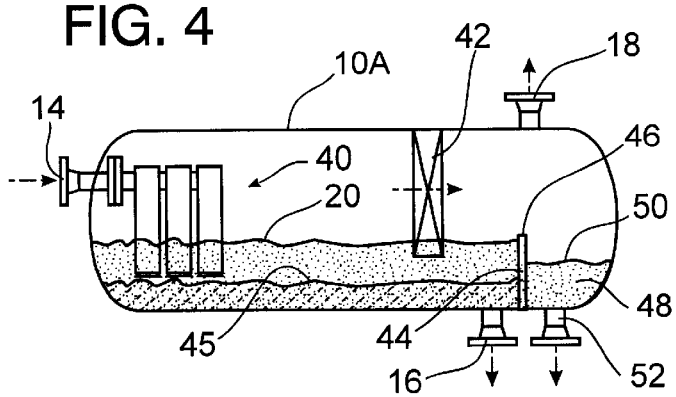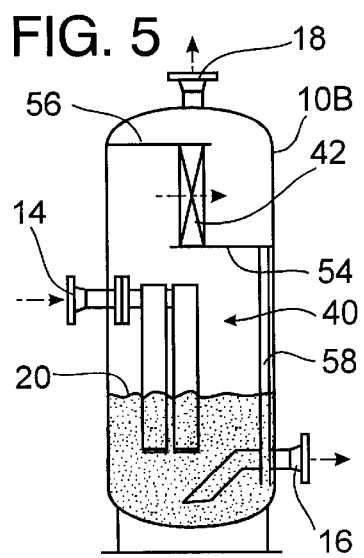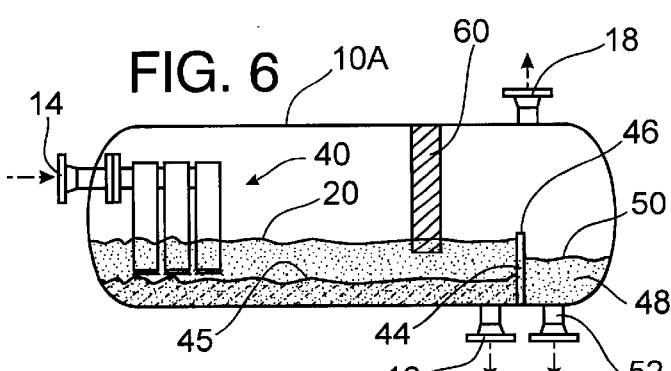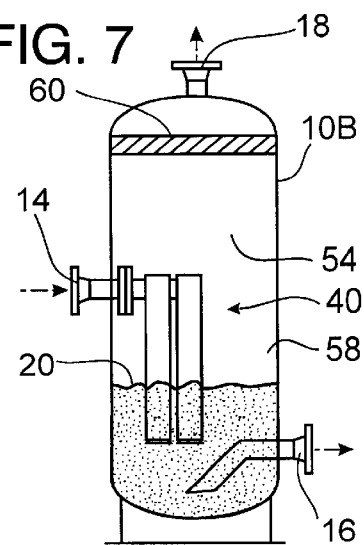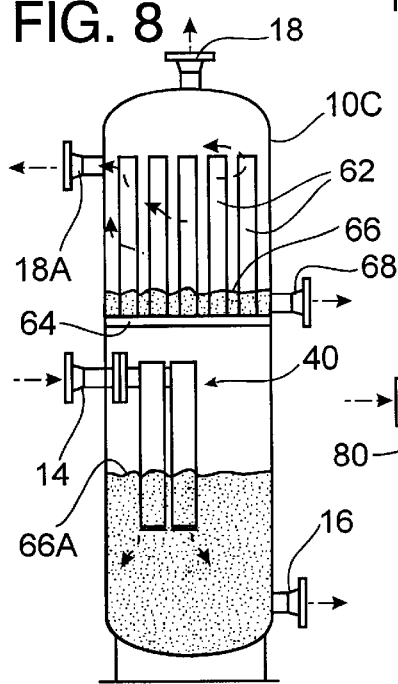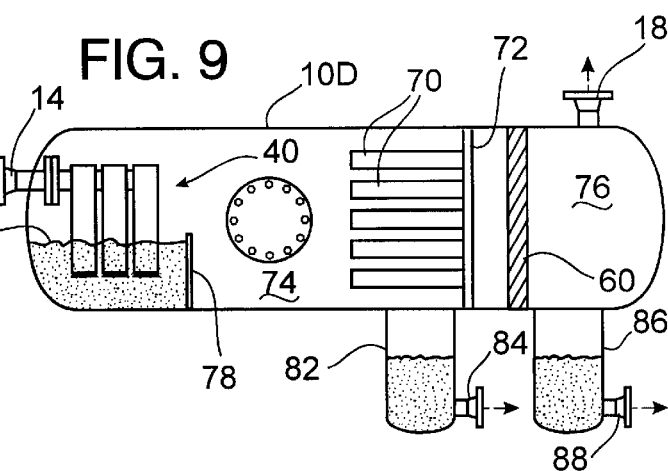

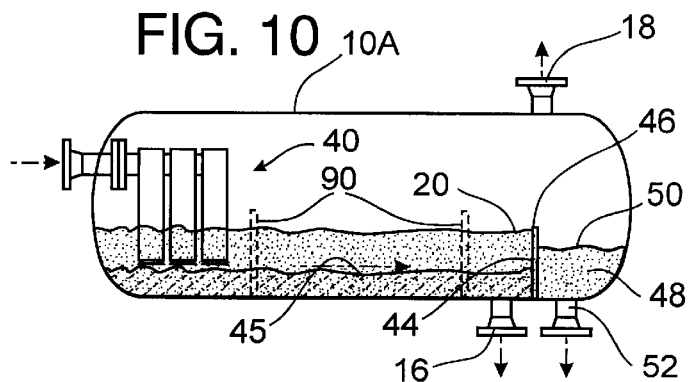
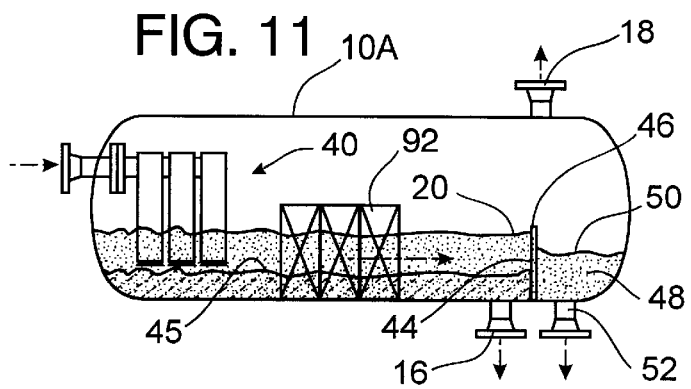
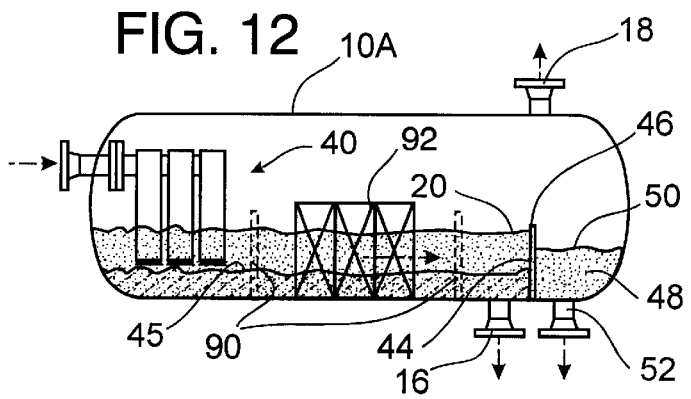
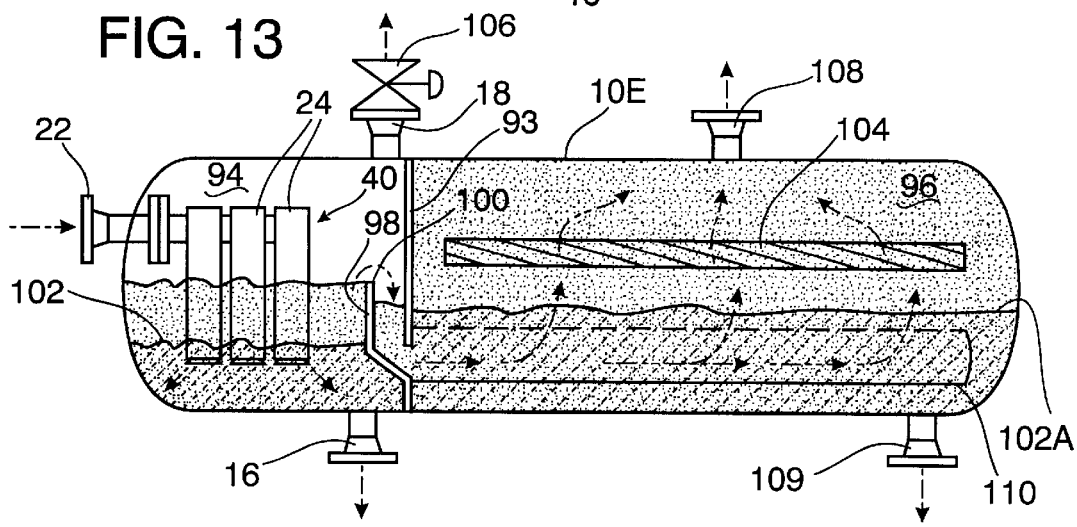

SYSTEM AND METHOD OF SEPARATING ENTRAINED IMMISCIBLE LIQUID COMPONENT OF AN INLET STREAM

CROSS REFERENCE OF RELATED APPLICATIONS

This application is not related to any pending United States or international patent application. This application is not referenced in any Microfiche Appendix.

BACKGROUND OF INVENTION

This disclosure is to a system and a method for separating an entrained immiscible liquid component from a gas stream.

The subject of the invention generally relates to gas/liquid (2 phase) separators or gas/liquid/solid (3 phase) separators. The invention may also be practiced in which the liquid phase is a mixture of an aqueous phase and an organic or hydrocarbon phase. Separators of this type are typically process vessels that may be at atmospheric or above atmospheric pressure. The main function of the separator system is to segregate immiscible phases of a process stream. The process stream may be in the form of gas that carries with it an immiscible liquid component, frequently referred to as a "wet gas" stream. The function of the separator of this invention is to separate out the liquid component to provide at the output of the separator a "dry gas" stream—that is, a gas stream that is relatively free from entrained liquids.

The systems and method of this disclosure are basically applicable to: (1) removing liquid dispersed in a gas stream, such as in which the liquid is of relatively little volume compared to the gas and in which the liquid may be primarily in the form of mist; and (2) removing gas from a liquid stream in which the gas is of a relatively small proportion (by weight) of the stream. In the first instance the separation process is generally referred to as "gas demisting" and in the second instance the separation process is generally referred to as "liquid degassing".

Separators for separating liquid components from a gas stream are commonly utilized in the oil and gas industry, specifically in oil and gas production, oil refining and gas processing, and are also used in the mining industry, chemical plants, water treatment facilities, pulp and paper plants and pharmaceutical manufacturing facilities.

Separation of immiscible components of a wet gas stream usually depends on the force of gravity. Gravity can be either natural gravity—that is, the pull of mass towards the center of the earth or created (artificial) gravitational forces such as represented by centrifugal separators. Natural gravity is usually used by flowing a stream having immiscible components into a vessel which provides a quiescent zone—that is, a relatively undisturbed environment that allows gravity to act on heavier components of the stream and move them into a downward part of the vessel. This movement has the counteraction of the lighter components of the stream migrating to an upward part of the vessel. In this way, the heavier components—that is, liquids, can be withdrawn from the lower part of the vessel and the lighter components—that is, gases, withdrawn from an upper part of the vessel.

Separators commonly have an inlet momentum absorber or deflector to reduce the momentum of the incoming stream and to distribute liquid and gas within the separator vessel. This kinetic energy reduction initiates phase separation inside a separator vessel.

Artificial gravity can be generated by the use of a vortex tube or tubes. A vortex tube is typically an elongated tube having a cylindrical interior wall that is preferably vertically mounted or at least mounted with a vertically downward tangent. The vortex tube (or each vortex tube if more than one is employed) has an inlet arranged so that wet gas flowing therein tangentially intersects the interior wall of the vortex tube and flows around the interior wall to thereby create centrifugal force that is applied to the components, the centrifugal force serving to move the heavier component—that is, the liquid component, towards the wall of the vortex tube while the lighter component (gas) is forced towards the interior of the tube. In a typical vortex tube, the gas is withdrawn from an upper central vortex opening while the liquid component is withdrawn from a liquid outlet in the bottom portion of the tube.

This invention herein is a system and method employing a separator internal process apparatus in combination with a vortex tube or a "vortex tube cluster". In a vortex tube cluster, each tube receives a portion of the incoming flow stream, which enters tangentially, creating rotation flow.

For additional background information relating to the general subject mater of this disclosure reference may be had to the following previously issued United States patents:

[Prior Art References]

| U.S. Pat. No. | INVENTOR | TITLE |
| --- | --- | --- |
| 1,836,004 | Becker | Apparatus for Treating Gas |
| 2,808,897 | Reinsch et al | Apparatus for Contacting Liquid and Vaporous Materials |
| 3,296,774 | Hoogendoorn et al | Gas-Liquid Contactor with Wall Obstructions and Contacting Method |
| 3,498,028 | Trouw | Apparatus for Contacting Liquids and Gases |
| 3,581,467 | Donnelly | Method and Apparatus for Vortical Liquid-Gas Movement |
| 3,605,388 | Zuiderweg et al | Apparatus for Contacting Liquids and Gases |
| 3,662,521 | Behar et al | Device for Reaction Between Liquid Phase and Gaseous Phase |
| 3,930,816 | Miczek | Structure for a Gas and Liquid Contacting Chamber in a Gas Effluent Processing System |
| 4,128,406 | Spevack | Contact Apparatus for Multiphase Processing |
| 4,486,203 | Rooker | Inlet Momentum Absorber for Fluid Separation |
| 4,838,906 | Kiselev | Contact-and-Separating Element |
| 4,880,451 | Konijn | Gas/Liquid Contacting |

A better understanding of the invention will be obtained from the following description and claims, taken in conjunction with the attached drawings.

SUMMARY OF INVENTION

The invention herein of a method, and a system for practicing the method, of separating an entrained immiscible liquid component from a gas stream. The method includes the steps of introducing a wet gas stream into a wet gas inlet of a treatment vessel, the vessel having a dry gas outlet and a liquid outlet. The wet gas stream is passed into at least one vortex tube but in the preferred practice of the invention, into a cluster of vortex tubes. Whether one or a plurality of vortex tubes, the wet gas passes into an inlet thereof wherein the gas is caused to circumferentially swirl within cylindrical walls of the vortex tube—that is, the wet gas stream rapidly rotates. The rapid rotation causes the heavier, liquid component and any entrained solids, to be moved to the external circumference of the rotating gas stream. A dry gas opening is provided centrally within an upper portion of each vortex tube and a liquids/solids outlet is provided in a lower end of each vortex tube.

Liquids and any entrained solids that pass out the lower end of the vortex tube collect in a lower portion of the treatment vessel while the dry gas moves to an upper portion of the vessel. The extracted liquid along with any entrained solids is withdrawn from the vessel through the liquid outlet. The gas passing out of the vortex tube or tubes typically is not completely dry but is substantially drier than the wet gas that passes into the treatment vessel. The gas passing out of the vortex tube or tubes is passed through a mist interceptor within the vessel wherein any remaining liquid or at least a substantial part of any remaining liquid, is stripped from the gas before the gas passes out of the vessel through the dry gas outlet. The mist interceptor may be, as examples, in the form of:

(1) a vane-type mist eliminator;
(2) a mesh-type mist eliminator;
(3) a cartridge-type coalescing element;
(4) a filter element; or
(5) a pack or a dump-type coalescing element.

The invention may be practiced in vessels having various shapes including cylindrical vessels horizontally or vertically arranged. The mist interceptor may be arranged in a variety of locations within the vessel. Liquid extracted from the wet gas stream may be treated within the vessel by the use of perforated plates, packed coalescing elements and/or electrostatic fields.

BRIEF DESCRIPTION OF DRAWINGS

FIGS. 1, 2 and 3 are representative of prior art.

FIG. 4 is a diagrammatic representation of a horizontally oriented process vessel having a wet gas inlet, a dry gas outlet and two liquid outlets. A vortex tube cluster and a vane-type mist eliminator are positioned within the vessel. Gas passes out of the vortex cluster passes through the mist eliminator before exiting through the dry gas outlet.

FIG. 5 is a representation of a vertical treatment vessel having a wet gas inlet that communicates with a cluster of vortex tubes and wherein compartments within the vertical structure causes gas flowing out of the vortex tube cluster to pass through a vane-type mist eliminator before the gas flows out through the dry gas outlet.

FIG. 6 represents a treatment vessel having a vortex tube cluster substantially as FIG. 4 but in which a mesh-type mist eliminator is employed. The mesh-type mist eliminator of FIG. 6 is a pad of woven, twisted or bunched filaments forming a discontinuous surface area for entrapping entrained liquid droplets.

FIG. 7 is a diagrammatic representation of a vertically oriented treatment vessel arranged similar to that of FIG. 5 but wherein a mesh-type mist eliminator is employed to extract mist from gas before it passes out the vessel dry gas outlet.

FIG. 8 illustrates a vessel having a wet gas inlet, a dry gas outlet and two liquid outlets. The vessel is vertically arranged and employs a vortex cluster augmented by cartridge-type coalescing elements to separate liquid from a wet gas stream.

FIG. 9 illustrates a system having the combination of a vortex tube cluster followed by cartridge-type filter elements in a horizontal vessel, further followed by a vane-type or mesh-type mist eliminator.

FIG. 10 shows a treatment vessel having a vortex tube cluster that receives the inlet flow of a wet gas stream. Perforated plate baffles are positioned transversely in the vessel liquid section. The plate baffles serve to improve flow distribution in the quiescent zone of the vessel to augment separation of two different liquid phases.

FIG. 11 shows the combination of a vortex tube cluster in a treatment vessel followed by one or more sections of packed coalescing elements in the liquid stream.

FIG. 12 illustrates a treatment vessel similar to that of FIGS. 10 and 11 but shows the combination of a vortex tube cluster, packed coalescing elements and perforated plate baffles.

FIG. 13 shows a treatment vessel that employs the combination of a vortex tube cluster with an electrostatic field coalescer employed to remove small highly dispersed or emulsified water droplets from oil.

DETAILED DESCRIPTION OF THE PREFERRED EMBODIMENTS

Figure 1:
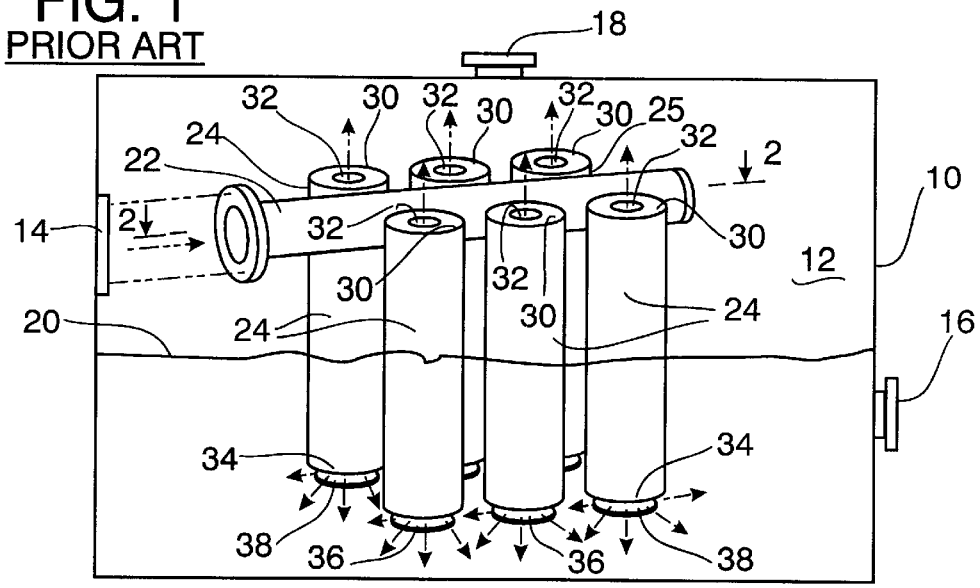
FIG. 1 is a cluster of vortex tubes positioned within a separator vessel. The vessel is shown diagramatically to illustrate a wet gas inlet, a dry gas outlet and a liquid outlet.

Referring to FIG. 1, a system for separating interdispersed gas and liquid phases is diagrammatically illustrated. Vessel 10 can be, as an example, a horizontal cylindrical vessel or a vertical cylindrical vessel or any other type of vessel that provides a quiescent internal zone 12. The vessel has a wet gas inlet 14, a liquid outlet 16 and a dry gas outlet 18. In the typical operation of a separator as shown in FIG. 1, a liquid level 20 is established within a lower portion of the vessel. A liquid level control means (well known in the art and not shown) is used to control the rate of liquid discharge so as to maintain liquid level 20.

Figure 2:
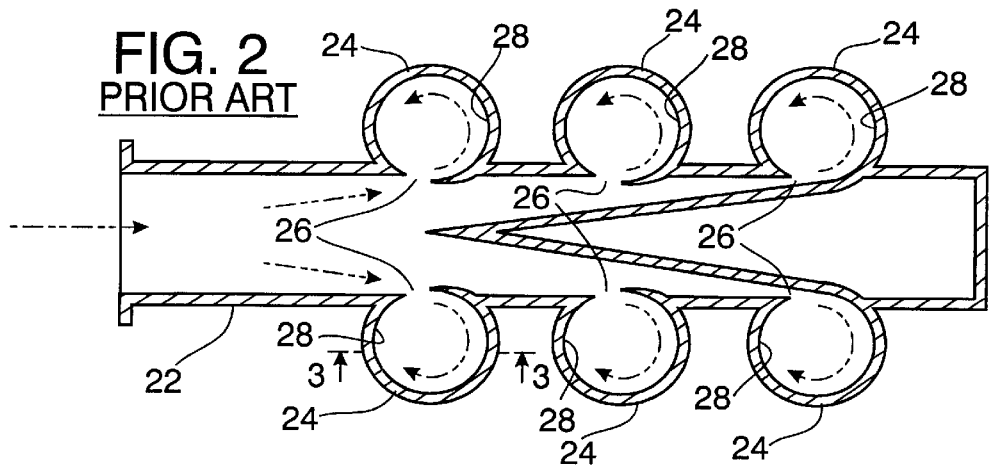
FIG. 2 is a horizontal cross sectional view taken along the line 2—2 of FIG. 1 showing the manner in which a wet gas stream introduced from a horizontal inlet tube flows into the vertically arranged vortex tubes.

FIG. 2 is a horizontal cross-sectional view taken through an upper portion of the vortex tube cluster of FIG. 1 showing a manifold 22 that receives an inlet stream through inlet 14 of the vessel of FIG. 1, and showing a plurality of vertically positioned vortex tubes 24. Each vortex tube has an inlet 26 in the vertical side wall thereof. Fluids under pressure flow through inlet 26 in each of the vortex tubes and enter the vortex tube tangentially—that is, as a tangent to the interior cylindrical side wall 28 of each of the vortex tubes. A wedge 29 is positioned in manifold 22 to better distribute the inlet stream into the vortex tubes. Instead of using a wedge 24 manifold 22 may be tapered in cross-sectional area or narrowed to equalize flow from the inlet stream into the individual vortex tubes 24.

Figure 3:
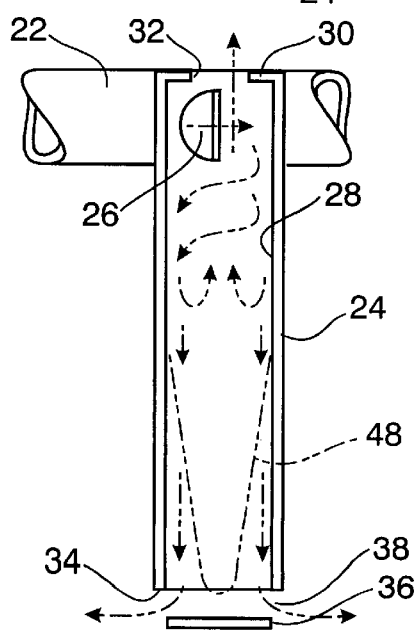
FIG. 3 is a vertical cross sectional view of one of the vortex tubes as taken along the line 3—3 of FIG. 2.

FIG. 3 is a cross-sectional view of a single vortex tube 24 that is representative of the other vortex tubes shown in the cluster. The upper end of each vortex tube is partially closed with a top plate 30 having a concentric dry gas outlet opening 32 therein. The bottom end 34 of each vortex tube 24 is open to permit the flow of liquid out of the lower bottom end. A horizontally positioned bottom diverter plate 36 is spaced from the bottom 34 of the vortex tube to allow a circumferential liquid outlet passageway 38. Bottom diverter plate 36 is typically supported to vortex tube 24 by spaced apart stand-off's that are not shown but can be in the form of short-length metal rods welded to the interior or exterior surface of the cylindrical wall of the vortex tube.

A vortex tube functions to separate immiscible liquid and gas components of a process stream by utilizing artificially created gravity—that is, centrifugal force. The process fluids enter the manifold 22 and flow through wet gas inlet 26 into the interior of the vortex tube tangentially so that the wet gas swirls at a rapid rate within the vortex tube as illustrated by the dotted lines in FIG. 3. The swirling gas forces entrained liquids against each vortex tube internal cylindrical side wall 28 where the liquid accumulates and flows downwardly by gravity to ultimately flow out of the vortex tube through liquid outlet passageway 38. The gas component of the process stream has substantially less density than the entrained liquid component, therefore the gas component migrates towards the axial-center of each vortex tube 24 and flows out through the upper concentric dry gas outlet 32. The swirling gas takes the form of a vortex in a pattern similar to that shown by the vortex boundary 48 as seen in FIG. 3.

FIGS. 1, 2 and 3 are representative of the state of the art to which this disclosures of this invention apply. This invention provides improved ways for use of vortex tube separation, and particularly vortex tube clusters, to obtain more effective separation of an entrained immiscible liquid component from a wet gas stream. Systems disclosed herein can operate with one or more vortex tubes. Each vortex tube is typically oriented vertically but can operate as long as it has a vertical downward tangent. The use of vortex tube clusters is preferred. A separator can include a single vortex tube, cluster of vortex tubes or a plurality of clusters of vortex tubes depending on the volume of process fluids being treated. The length of each vortex tube can vary. If long length vortex tubes are employed a vertically oriented vessel may be preferred.

The improvements of the invention are illustrated in FIGS. 4 though 16 as will now be described. FIG. 4 is an elevational cross-sectional view of a horizontal separator vessel 10A that has an inlet 14, a dry gas outlet 18 and a liquid outlet 16. Positioned within the interior of vessel 10A is a vortex tube cluster generally indicated by the numeral 40 as illustrated and described with reference to FIGS. 1 and 2. A liquid level 20 is maintained within vessel 10A. While the vortex tube cluster 40 functions to extract a substantial percentage of any entrained liquids entering through inlet 14 nevertheless in the usual case the gas that emanates from the upper ends of the individual vortex tubes making up cluster 40 can have some residual entrained liquid component. To further de-mist the gas before it exits through gas outlet 18 the separator of FIG. 4 includes a vane-type mist eliminator 42. Such vane-type mist eliminators consist of closely spaced parallel vanes, bent or formed to create a torturous path for gas passing therethrough. The vanes are very closely spaced and are usually short from leading edge to trailing edge.

Vane-type mist eliminators have been used previously in industry for augmenting the separation of entrained liquids from a gas stream but have a common problem in that they can easily become flooded with liquid if too much entrained mist is carried into them by the gas stream. Flooding occurs when liquid bridges the gap between adjacent vanes over a significant portion of the vane flow area. If flooded, liquid-in-gas carryover can result. The concept as revealed in FIG. 4 is an improved way of using a vane-type mist eliminator 42 in the treatment of wet gas. The use of a vortex tube cluster 40 in advance of vane-type mist eliminator 42 results in removal of a substantial portion of entrained liquid from the wet gas stream before the wet gas stream passes through the vane-type mist eliminator, thus substantially reducing the possibility of flooding of the mist eliminator. The combination of a vortex tube cluster separation system with a vane-type mist eliminator minimizes the need for a large gravitation separation section in vessel 10A. Thus, the combination of the vortex tube cluster 40 and vane-type mist eliminator 42 can result in a significantly reduced size of vessel 10A required to treat a given gas flow stream rate to thereby reduce the overall cost of a separator.

The vane-type mist eliminator preferably closes the full interior area of vessel 10 above liquid level 20—that is, the lower edge of vane-type mist eliminator 42 extends within liquid retained in the lower portion of the vessel to ensure that all of the gas passing out from vortex tube cluster 40 passes through mist eliminator 42 before exiting the vessel through dry gas outlet 18.

If the liquid extracted from wet gas flowing through the vessel 10A is of two-phases—that is, if the liquid includes, as an example, both a water phase and a hydrocarbon phase (such as crude oil), the liquid outlet may be separated into two portions. As shown in FIG. 4 a partition wall 44 divides the lower portion of vessel 10A into two parts. Any hydrocarbon or lighter component of the extracted liquid will float on the surface of a denser liquid phase above an interface 45 and can flow over the upper edge 46 of partition wall 44 into a lower liquid interior section 48 of vessel 10A that has a lower liquid level 50. The lighter density (oil) phase having liquid level 50 may be withdrawn through a second liquid outlet 52. If the liquid component of the wet gas stream is of a single phase or if no separation of liquid components is required, then partition wall 44 and second liquid outlet 52 may be eliminated. In the operation of the system of FIG. 4, it would be necessary to have a liquid level control to regulate the height of liquid level 50 in the section 48 of the vessel interior and such liquid height control is not shown since it is well known and commonly practiced in the art of gas/liquid separation.

FIG. 5 is an alternate embodiment of the system of FIG. 4 that employs the combination of a vortex tube cluster and a vane-type mist eliminator. In the arrangement of FIG. 5, vessel 10B is a vertically oriented elongated cylindrical vessel that has an inlet 14, a vortex tube cluster 40, a dry gas outlet 18 and a liquid outlet 16, all functioning as described with reference to FIG. 4. In FIG. 5 the vortex tube cluster 40 is illustrated as if it has four separate vortex tubes rather than six (as in FIG. 4) but the function is the same. As previously noted, the number of vortex tubes in a cluster can vary from one to many depending upon the volume of process fluids handled by the system and the physical arrangement of the vessel.

In the arrangement of FIG. 5 a first lower partial horizontal shelf 54 and a second upper partial horizontal shelf 56 are utilized. Extending between shelves 54 and 56 is a vane-type mist eliminator 42 that is constructed like, and has the same function as, the mist eliminator in FIG. 4. The dry gas passing out the upper ends of the individual vortex tubes making up vortex cluster 40 must pass through mist eliminator 42 before exiting the vessel through dry gas outlet 18. In this way, vane-type mist eliminator 42 will extract a substantial portion of any remaining liquid carried by the gas stream. Thus the arrangement of both FIGS. 4 and 5 places in series a vortex tube cluster 40 and a vane-type mist eliminator 42 to enhance the separation of interdispersed phases in the process stream.

Additional liquid extracted from the gas stream flowing through mist eliminator 42 in FIG. 5 falls onto first horizontal shelf 54. An opening in the shelf receives the upper end of a conduit 58 by which liquid extracted by mist eliminator 42 is passed downwardly into the lower interior end portion of vessel 10B, the lower end of conduit 58 extending below liquid level 20.

Mist eliminators 42 of the type employed in the arrangement of FIGS. 4 and 5 are, as previously indicated, well known devices used in industry for separating entrained liquids from a gas stream and are formed by a plurality of closely spaced vanes through which the gas flows. These vanes can be arranged in a variety of ways within the vessel, all well known in the art such as in a thru-flow system, a cross-flow system, a radial-flow system and so forth. Regardless of the specific arrangement of vanes in the vane-type mist separator, the essence of the invention as illustrated in FIGS. 4 and 5 is the combination of a vortex tube cluster and vane-type mist eliminator in which the gas first passes through the vortex tube cluster wherein a substantial portion of entrained liquid is removed so that flooding is less likely to occur in the vane-type mist eliminator.

FIG. 6 illustrates an embodiment of the invention wherein vessel 10A has an inlet 14, a vortex tube cluster 40, a dry gas outlet 18, a liquid outlet 16, a partition wall 44, a first liquid outlet 16 and a second liquid outlet 52 all have the same function as described with reference to FIG. 4. The only difference between the embodiment of FIGS. 4 and 6 is that instead of a vane-type mist eliminator as in FIG. 4, FIG. 6 illustrates the use of a mesh-type mist eliminator 60. Mesh-type mist eliminators use a pad of woven, twisted or bunched filaments forming a large but discontinuous surface area for entrained liquid droplets to impinge against and cling to. The filaments used in a mesh-type mist eliminator may consist of metallic wire or a composite of wire interwoven with finer filaments such as made of Nylon®, Teflon® or so forth. The filaments are closely spaced and because of their random configuration, they drain themselves slowly compared to other types of mist eliminators. Therefore, mesh-type mist eliminators can easily become flooded if too much entrained liquid is carried into it by a gas stream. If flooded, liquid-in-gas carryover may result. In the embodiment of FIG. 6, the chance of flooding of mesh-type mist eliminator 60 is substantially reduced due to the provision of the vortex tube cluster 40 by which a substantial portion of liquid entrained in inlet 14 is removed before the relatively dry gas from the vortex tube cluster passes through mesh-type mist eliminator 60. As in the case of the vane-type mist eliminator of FIG. 4, the use of the mesh-type mist eliminator 60 of FIG. 6 in combination with a vortex tube cluster improves de-misting performance and can result in reduced separator size in many cases—that is, the size of vessel 10A can be reduced since a large volumetric area is not required for gravity separation.

FIG. 7 bears the same relationship to FIG. 6 as FIG. 5 does to FIG. 4—that is, FIG. 7 shows a mesh-type mist eliminator 60 used in a horizontal fashion in a vertically oriented vessel in combination with vortex tube cluster 40. Whereas FIG. 7 shows the mesh-type mist eliminator horizontally mounted, which can be placed in a vertical arrangement as in FIG. 5 if desired.

FIG. 8 diagrammatically illustrates the embodiment of the invention wherein a vortex tube cluster 40 is employed in combination with a plurality of cartridge-type coalescing elements 62. Vessel 10C has a horizontal plate 64 spaced above vortex tube cluster 40, the plate dividing the interior of vessel 10C into an upper portion and a lower portion. Horizontal plate 64 has a plurality of spaced apart openings (not seen), one for each cartridge-type coalescing element 62. Each coalescing element 62 typically employs a very fine porous network that can easily be flooded with liquid if too much entrained mist is carried into it by the gas stream. If flooded, liquid-in-gas carryover may result. By preceding coalescing elements 62 with vortex tube cluster 40 the bulk of liquid carried by gas entering wet gas inlet 14 is removed before the relatively dry gas from the vortex tubes is passed upwardly into coalescing elements 62, thereby substantially reducing the possibility of these elements being flooded.

Coalescers such as the cartridge-type coalescers 62 function by providing hydrophilic fibrous material to which water droplets cling so that the droplets coalesce from fine droplet size into larger droplet size, the larger droplet size flowing downwardly and out of the coalescers, the liquid accumulating to a level 66 above horizontal plate 64. The liquid level accumulating in the upper portion of the vessel above horizontal plate 64 passes out through a secondary liquid outlet 68. A method of maintaining water levels 66 and 66A is required, as is standard procedure in designing equipment to extract entrained liquid from a gas stream In the arrangement of FIG. 8, the dry gas outlet 18 is shown the same as in FIGS. 5 and 7 however, an alternate location for the dry gas outlet is indicated by 18A. Normally the use of two dry gas outlets would not be required.

FIG. 9 shows a treatment vessel that employs a vortex cluster 40 in series with horizontally supported cartridge-type filter elements 70. Filter elements 70 are primarily for intercepting and removing of solid particles in a gas stream but frequently have the secondary function of coalescing liquid droplets to aid liquid separation. Elements 70 typically have a very fine porous network that can easily become saturated with liquid if excessive entrained mist is carried into them by the gas stream. If flooded, liquid-in-gas carryover may result. By preceding filter elements 70 with vortex tube cluster 40, the majority of any entrained liquid in the inlet gas stream is removed before the drier gas from the vortex tube cluster passes through filter elements 70. The combination of the vortex tube cluster 40 and filter elements 70 can prevent liquid carryover and can serve to reduce vessel size since a large area for gravitational separation is not required. The use of filter elements 70 in combination with the vortex cluster as in FIG. 9a can be achieved using either a horizontal vessel as illustrated or a vertical vessel.

In the embodiment of FIG. 9, a vertical wall 72 divides the interior of vessel 10D into two portions. The vertical wall has openings therein (not seen) each of which is in communication with the interior of a filter element 70 so that gas passing from the first section 74 of the interior of vessel 10D into the second section 76 passes through filter elements 70.

A short height wall 78 provides an area to receive and maintain liquid to a level 80 that covers the lower ends of the vortex tubes in cluster 40, the liquid level 80 functioning as described for water level 20 in FIG. 1. Excess liquid flows over the top of a short height wall 78 and into a catch system 82 by which the liquid is drained away through outlet 84. A similar liquid catch system 86 communicates with the second internal section 76 of vessel 10D by which liquid is discharged through outlet 88.

FIG. 9 shows optionally a mesh-type or vane-type mist eliminator 60 so that any mist carryover that is not captured by vortex tube cluster 40 or filter elements 70 can be intercepted and extracted from the gas stream before the dry gas exits through dry gas outlet 18.

FIG. 10 diagrammatically illustrates the concept of providing a series relationship between vortex tubes (represented by vortex tube cluster 40) and perforated plate baffles in the liquid section. A pair of spaced apart perforated plate baffles 90 cover the bottom portion of the interior of vessel 10A so that liquid extracted from a wet gas stream by the vortex tube cluster 40 must flow through baffles 90 before flowing out of the vessel through liquid outlet 16. Perforated plate baffles are sometimes installed to improve liquid phase distribution in a quiescent zone of a separator. By use of perforated baffles 90 gravity separation efficiency is improved. The combination of a vortex tube cluster 40 with perforated plates 90 creates a two step oil/water separation process whereby the high gravity field inside vortex tube cluster 40 induces bulk separation and the perforated plates coerce coalescence of water droplets dispersed in oil and oil droplets dispersed in water. Perforated baffles 90 then utilize retention volume more efficiently and maximize true retention time of the liquid phases. This sequence optimizes oil/water separation performance and allows a reduction in the separator vessel size.

The vessel of FIG. 10 is arranged like the vessel of FIGS. 4 and 6 for two-phase liquid separations wherein a partition wall 44 having an upper edge 46 allows a hydrocarbon component to flow on a water level and to pass over edge 46 and into section 48 of the interior of the vessel where a second liquid level 50 is maintained. The accumulated liquid hydrocarbon component is passed out through second liquid outlet 52.

FIG. 11 shows the combination of vortex tube separation and one or more sections of packed coalescing elements in the liquids section, the packed coalescing elements being indicated by the numeral 92. Packed coalescing elements 92 are of either the structured packing-type or the dump-packing-type. The structured packing-type usually has a pre-formed rigid structure characterized by a path for liquid flow in the primary flow direction. Such structure packed coalescing elements are commercially available under the trademark "PERFORMAX®". These elements can be oriented in a number of ways.

"Dump-packing" refers to loose aggregate packing such as of Pall rings or ceramic saddles that are poured into the coalescing chamber. These elements aid gravity settlement efficiency by helping distribute flow, by reducing turbulence, by introducing impingement surfaces, by reducing the required rise/fall distances of the dispersed phases and by creating inertial separation forces. The combination of vortex tube cluster 40 and coalescing elements 92 whether of the structured packing-type or the dump-packing-type creates a two step oil/water separation process whereby the high velocity gravity fields inside the vortex tubes 40 induce bulk separation and coerces coalescence of water droplets dispersed in oil and of oil droplets dispersed in water. Then the coalescing elements 92 provide low turbulence conducive to separation. This optimizes oil/water separation performance and achieves a reduction in the separator vessel size. In the embodiment of FIG. 11 the dry gas passing out of vortex tube cluster 40 flows the length of vessel 10A to exit through gas outlet 18. If required, vane-type-mist extractors or mesh-type mist extractors could be interposed in the pathway of the gas flowing from the vortex tube cluster to exit 18.

FIG. 12 is an embodiment of the invention as illustrated in FIG. 11 with the addition of two perforated plate distributor baffles as has been described with reference to FIG. 10. Thus in FIG. 12, liquid having been extracted by vortex tube cluster 40 flows through a first perforated plate 90 and then through coalescing elements 92 which may either be of the structured packing-type or the dump-packing-type as has been described with reference to FIG. 11. The liquid then further flows through a second perforated plate 90 before the liquid passes out through water outlet 16. A lighter density or hydrocarbon phase of the liquid (if it exists) passes out through second liquid outlet 52. Therefore, in FIG. 12, four separation components are used in series—that is: (1) a vortex tube cluster 40 wherein a major portion of any entrained liquids are extracted from an essentially gas inlet stream or a major portion of gas is separated from an essentially liquid inlet stream; the wet gas inlet stream; (2) a first perforated plate distributor baffle 90; (3) one or more coalescing elements 92; and (4) a second perforated plate distributor baffle 90.

FIG. 13 is a diagrammatic representation of a separator system that combines the advantages of a vortex tube cluster 40 with electrostatic separation achieved by an electric field. FIG. 13 shows a vessel 10E having a vertical wall 93 dividing the vessel into a liquid extraction compartment 94 and a hydrocarbon/water separation section 96. An upwardly extending a partition wall 98 having an upper edge 100 augments wall 93. By means of interface detectors and level controls (that are not shown in the drawing but are well known to practitioners of gas/water/hydrocarbon separation) a hydrocarbon/water interface level 102 is maintained in section 94 and in like manner a hydrocarbon/water interface 102A is maintained in section 96. Water in the lower portion of section 94 is drawn off through water outlet 16. The hydrocarbon phase flows over the upper edge 100 of partition wall 98 and passes into the vessel hydrocarbon/water separation section 96 through a spreader 110. In section 96, oil with any entrained water is subject to an electric field diagrammatically illustrated by 104 to thereby augment coalescence and separation of water droplets from the oil. Gas that is extracted from the incoming fluid stream by vortex tubes flow out the upper ends of the tubes 24 into the upper portion-of vessel compartment 94. Gas is withdrawn through gas outlet 18. However, a back pressure valve 106 on gas outlet 18 maintaining pressure within the vessel sufficient to cause oil separated within section 96 to flow out of vessel 10E through an upper oil outlet 108 while water flows out of section 96 through water outlet 109.

Electric field 104 may be oriented in various configurations within vessel 10E and may provide an AC, a DC or a Dual Polarity® field. Flow through electric field 104 can be vertical or horizontal. Electric oil fields generate attractive forces between dispersed water-in-oil droplets to speed up droplet coalesce. This process requires a relatively low water fraction entering the field. Typically, electric field coalescence is intolerant of gas disturbance. In the system as shown in FIG. 13 the use of vortex tube cluster 40 allows the degassing functions to be performed in a smaller liquid extraction section 94 of vessel 10E thus aiding overall performance and reducing vessel size. The combination of vortex tube separation achieved by vortex tube cluster 40 combined with electric field 104 causes the separate liquid phases to coalesce more quickly thus promoting faster bulk water removal.

A typical system for coalescing heavier and lighter components for an emulsion is illustrated in U.S. Pat. No. 4,400,253 entitled, "Voltage Control System for Electrostatic Oil Treater", the patent having issued on Aug. 23, 1983. The electric fields through which emulsions are subjected to augment coalescence in this disclosure are varied from DC fields to alternating current fields. U.S. Pat. No. 4,417,971 entitled, "Circuit for Maintaining the Strength of an Electrostatic Field Generated in a Fluid Mixture of Varying Dielectric Strength" that issued on Nov. 29, 1983 teaches a system in which a DC field is established between spaced apart electrodes through which an emulsion passes.

The physical arrangement of systems for subjecting an emulsion to an electric field can vary considerably. As previously mentioned, a typical vessel is a horizontal cylindrical vessel having therein parallel spaced apart plates of conductive metal with a lighter component or oil outlet above the plates and a water outlet below the plates and with an emulsion inlet arranged so that at least a substantial portion of the emulsion passes between the plates. Another system for treating emulsions includes the use of an upright cylindrical vessel having a tubular electrode and a central electrode extending axially within the tubular electrode, the emulsion passing upwardly through the field established between the tubular electrode and the central electrode. This system is illustrated in U.S. Pat. No. 5,575,896 entitled, "Method and Apparatus for Oil/Water Separation Using a Dual Electrode Centrifugal Coalescer". For an example of a system that uses a plurality of electrodes, in the form of flat plates, resulting in a plurality of electric fields through which emulsion passes, reference can be had to U.S. Pat. No. 4,804,453 entitled, "Resolution of Emulsions for Multiple Electric Fields". This system and method of this invention can be practiced by employing a vortex tube cluster followed by an electric field such as these taught in these United States patent mounted in a common treatment vessel.

The system of FIG. 13 may include the use of other components as illustrated herein such as the use of vane-type mist eliminators, mesh-type mist eliminators, coalescing elements, filter elements or perforated plates arranged in various combinations as suggested by the illustrations of FIGS. 4–12.

It can be seen that FIGS. 4 through 13 illustrate a number of different combinations of separation system components that exploit the advantages of a vortex tube cluster for extracting a substantial majority of liquid entrained in a wet gas stream. In each example, a vortex tube cluster is followed by subsequent treatment elements and systems that further reduce the dryness of the gas passing out of the system or that aid in the separation of heavier and lighter components of the liquid extracted from a wet gas stream. The systems herein take advantage of the high efficiency per unit volume required for vortex tube clusters to remove entrained liquids from wet gas streams to thereby reduce overall vessel sizes of separator systems.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims or claims, including the full range of equivalency to which each element thereof is entitled.

What is claimed is:

1. A system for separating entrained immiscible component of an inlet stream comprising:
   a vessel having an interior in communication with an inlet, a dry gas outlet and a liquid outlet;
   at least one vortex tube supported within said vessel interior having an inlet in communication with said vessel inlet and having a gas outlet and a liquid outlet; and
   one or more filter cartridges supported within said vessel interior interposed between said vortex tube gas outlet and said vessel dry gas outlet.

2. A system according to claim 1 wherein liquid flowing out of said at least one vortex tube liquid outlet is of immiscible lighter and heavier liquid components and wherein said vessel provides separate lighter and heavier liquid component outlets.

3. A system according to claim 2 including:
   at least one perforated plate positioned within said vessel through which liquid flowing out of said at least one vortex tube liquid outlet passes before passing out of said vessel through said lighter and heavier liquid component outlets.

4. A system according to claim 2 including:
   at least one coalescing elements positioned within said vessel through which said liquid flowing out of said at least one vortex tube liquid outlet passes before passing out of said vessel through said lighter and heavier liquid component outlets.

5. A system according to claim 2 including:
   apparatus providing an electric field positioned within said vessel through which said liquid flowing out of said at least one vortex tube liquid outlet passes before passing out of said vessel through said lighter and heavier liquid component outlets.

6. A system according to claim 2 including:
   at least one perforated plate positioned within said vessel through which liquid flowing out of said at least one vortex tube passes before passing out of said vessel through said lighter and heavier liquid component outlets.

7. A system according to claim 2 including:
   at least one coalescing element positioned within said vessel through which liquid flowing out of said at least one vortex tube liquid outlet passes before passing out of said vessel through said lighter and heavier liquid component outlets.

8. A system according to claim 2 including:
   at least one filter cartridge positioned within said vessel through which liquid flowing out of said at least one vortex tube liquid outlet passes before passing out of said vessel through said lighter and heavier liquid component outlets.

9. A system according to claim 2 including:
   an electric field system positioned within said vessel through which liquid flowing out of said at least one vortex tube liquid outlet passes before passing out of said vessel through said lighter and heavier liquid component outlets.

10. A method for separating interdispersed gas and liquid phases of an inlet stream comprising:
    introducing the inlet stream into a vessel having a dry gas outlet, lighter liquid component outlet and a heavier liquid component outlet;
    passing the inlet stream into at least one vortex tube supported within said vessel, the vortex tube having a gas outlet and a liquid outlet;
    rapidly rotating said inlet stream within said at least one vortex tube to separate out at least a substantial portion of said interdispersed liquid phase and passing reduced moisture gas out said vortex tube gas outlet and separated liquid out said vortex tube liquid outlet into the interior of said vessel;
    passing said reduced moisture gas through a mist eliminator within said vessel to provide dry gas out through said vessel dry gas outlet, separated liquid being discharged through said vessel liquid outlet; and flowing said separated liquid out of said at least one vortex tube liquid outlet through an electric field positioned within said vessel to augment separation of said separated liquid into lighter and heavier liquid components that pass out of said vessel through said lighter and heavier liquid component outlets.

11. A method for separating interdispersed gas and liquid phases of an inlet stream according to claim 10 wherein said step of passing said reduced moisture gas through a mist eliminator includes passing said reduced moisture gas through a vane-type mist eliminator.

12. A method for separating interdispersed gas and liquid components of an inlet stream according to claim 10 wherein said step of passing said reduced moisture gas through a mist eliminator includes passing said reduced moisture gas through a mesh-type mist eliminator.

13. A method for separating interdispersed gas and liquid components of an inlet stream according to claim 10 wherein said step of passing said reduced moisture gas through a mist eliminator includes passing said reduced moisture gas through one or more coalescing elements.

14. A method for separating interdispersed gas and liquid components of an inlet stream according to claim 10 wherein said step of passing said reduced moisture gas through a mist eliminator includes passing said reduced moisture gas through one or more coalescing elements.

15. A method according to claim 10 including the step of flowing said separated liquid flowing out of said at least one vortex tube liquid outlet through at least one perforated plate positioned within said vessel to augment separation of said heavier and lighter liquid components.

16. A method according to claim 10 including the step of flowing said separated liquid flowing out of said at least one vortex tube liquid outlet through at least one coalescing elements positioned within said vessel to augment separation of said heavier and lighter liquid components.

17. A system for separating entrained immiscible components of an inlet stream comprising:

a vessel having an interior in communication with an inlet, a dry gas outlet, a lighter liquid component outlet and a heavier liquid component outlet;

at least one vortex tube supported within said vessel interior having an inlet in communication with said vessel inlet and having a gas outlet and a liquid outlet;

a mist eliminator supported within said vessel interior interposed between said vortex tube gas outlet and said vessel dry gas outlet; and an electric field positioned within said vessel through which liquid flowing out of said at least one vortex tube liquid outlet passes to augment separation of the liquid component into lighter and heavier liquid components that are passed out of said vessel through said lighter and heavier liquid component outlets.

18. A system according to claim 17 wherein said mist eliminator is a vane-type mist eliminator having a plurality of parallel vanes arranged to create tortuous paths through which gases must pass to exit through said vessel dry gas outlet.

19. A system according to claim 17 herein said mist eliminator is a mesh-type mist eliminator formed of woven, twisted and/or bunched filaments providing a large but discontinuous surface area.

20. A system according to claim 17 wherein said mist eliminator is in the form of one or more coalescing elements.

21. A system according to claim 17 wherein liquid flowing out of said at least one vortex tube liquid outlet is of immiscible lighter and heavier liquid components and wherein said vessel provides separate lighter and heavier liquid component outlets.

22. A system according to claim 21 including:

at least one perforated plate positioned within said vessel through which liquid flowing out of said at least one vortex tube liquid outlet passes before passing out of said vessel through said lighter and heavier liquid component outlets.

23. A system according to claim 21 including:

at least one coalescing elements positioned within said vessel through which said liquid flowing out of said at least one vortex tube liquid outlet passes before passing out of said vessel through said lighter and heavier liquid component outlets.

24. A system according to claim 21 including:

at least one filter cartridge positioned within said vessel through which liquid flowing out of said at least one vortex tube liquid outlet passes before passing out of said vessel through said lighter and heavier liquid component outlets.

* * * * *